US012619460B2

(12) United States Patent
Stelmar Netto et al.

(10) Patent No.: US 12,619,460 B2
(45) Date of Patent: May 5, 2026

(54) REMOTELY HEALING CRASHED PROCESSES

(71) Applicant: INTERNATIONAL BUSINESS MACHINES CORPORATION, Armonk, NY (US)

(72) Inventors: Marco Aurelio Stelmar Netto, Sao Paulo (BR); Bruno Silva, Sao Paulo (BR); Renato Luiz de Freitas Cunha, Sao Paulo (BR); Renan Francisco Santos Souza, Rio de Janeiro (BR); Lucas Correia Villa Real, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/480,087

(22) Filed: Sep. 20, 2021

(65) Prior Publication Data

US 2023/0088318 A1     Mar. 23, 2023

(51) Int. Cl.
*G06F 9/48*          (2006.01)
*H04L 67/00*         (2022.01)
*H04L 67/04*         (2022.01)
(52) U.S. Cl.
CPC ............ *G06F 9/4856* (2013.01); *H04L 67/04* (2013.01); *H04L 67/34* (2013.01)
(58) Field of Classification Search
None
See application file for complete search history.

(56) References Cited

U.S. PATENT DOCUMENTS

| | | | |
|---|---|---|---|
| 6,195,695 B1 | 2/2001 | Cheston et al. | |
| 6,226,651 B1 | 5/2001 | Masuda | |
| 6,266,784 B1 | 7/2001 | Hsiao | |
| 6,636,988 B1 | 10/2003 | Firley | |
| 6,751,636 B1 | 6/2004 | Mende, Jr. | |

(Continued)

FOREIGN PATENT DOCUMENTS

| | | |
|---|---|---|
| CN | 105229613 B | 3/2018 |
| CN | 115840691 A | 3/2023 |

(Continued)

OTHER PUBLICATIONS

O'Callahan, R. et al., "Engineering Record And Replay For Deployability Extended Technical Report"; arXiv: 1705.05937v1 [cs.PL] (2017); 20 pgs.

(Continued)

*Primary Examiner* — Ario Etienne
*Assistant Examiner* — Mohammad Yousuf A. Mian
(74) *Attorney, Agent, or Firm* — CHIP LAW GROUP

(57) ABSTRACT

A method of repairing crashed applications includes detecting a crash in an application operating in a host computing device. The application is migrated to a remote computer server. The remote computer server provisions computing resources to the application, while the application is resident in the remote computer server. Resumed operation of the application is executed, using the provisioned computing resources, in the remote computer server. Execution results are generated from the application, in the remote computer server. The generated execution results are migrated from the application back to the host computing device.

18 Claims, 8 Drawing Sheets

(56) References Cited

U.S. PATENT DOCUMENTS

| | | | |
|---|---|---|---|
| 7,162,629 B2 | 1/2007 | Zimmer et al. | |
| 7,546,482 B2 | 6/2009 | Blumenau et al. | |
| 7,779,295 B1* | 8/2010 | Shah | G06F 11/2046 |
| | | | 714/6.32 |
| 8,006,134 B2 | 8/2011 | Nammatsu et al. | |
| 8,924,782 B2 | 12/2014 | Locasto et al. | |
| 8,930,747 B2 | 1/2015 | Levijarvi | |
| 9,208,032 B1 | 12/2015 | McAlister et al. | |
| 9,218,246 B2 | 12/2015 | Nagesharao et al. | |
| 9,250,827 B2 | 2/2016 | Beveridge | |
| 9,465,632 B2 | 10/2016 | Ebcioglu et al. | |
| 9,727,439 B2 | 8/2017 | Mohammed et al. | |
| 10,019,327 B1* | 7/2018 | Backensto | G06F 11/1482 |
| 10,129,373 B2 | 11/2018 | Firley | |
| 10,169,174 B2 | 1/2019 | Jain | |
| 10,452,514 B2* | 10/2019 | Cabrera | G06F 11/3065 |
| 10,474,469 B2 | 11/2019 | Schuttenberg | |
| 10,740,088 B2 | 8/2020 | Suzuki et al. | |
| 10,958,720 B2 | 3/2021 | Savino | |
| 2005/0193227 A1* | 9/2005 | Nakahara | G06F 11/3452 |
| | | | 714/E11.073 |
| 2009/0055507 A1* | 2/2009 | Oeda | G06F 9/4856 |
| | | | 709/216 |
| 2010/0058108 A1* | 3/2010 | Nammatsu | H04L 41/0677 |
| | | | 714/39 |
| 2012/0102098 A1* | 4/2012 | Guillou | G06F 9/5083 |
| | | | 709/203 |
| 2012/0102369 A1* | 4/2012 | Hiltunen | G06F 11/008 |
| | | | 714/48 |
| 2014/0045485 A1* | 2/2014 | Jain | H04W 52/0245 |
| | | | 455/420 |
| 2014/0344447 A1* | 11/2014 | Cho | H04L 67/025 |
| | | | 709/224 |
| 2015/0067409 A1* | 3/2015 | Martz | G06F 21/52 |
| | | | 714/47.2 |
| 2017/0083399 A1* | 3/2017 | Smirnov | G06F 11/0778 |
| 2017/0353397 A1* | 12/2017 | Che | H04L 67/10 |
| 2018/0322022 A1 | 11/2018 | Garlapati | |

FOREIGN PATENT DOCUMENTS

| | | | |
|---|---|---|---|
| JP | 2010-086516 A | 4/2010 | |
| JP | 7044413 B1 | 3/2022 | |
| JP | 2022-130842 A | 9/2022 | |
| JP | 2023-044720 A | 3/2023 | |
| WO | 2018/087906 A1 | 5/2018 | |

OTHER PUBLICATIONS

Dunlup, G. et al., "ReVirt: Enabling Intrusion Analysis through Virtual-Machine Logging and Replay"; USENIX Association 5th Symposium on Operating Systems Design and Implementation (2002); 14 pgs.

Ren, J. et al., "Understanding Application Recomputability without Crash Consistency in Non-Volatile Memory"; Association for Computing Machinery (2018); 10 pgs.

Moran, K. et al., "Automatically Discovering, Reporting and Reproducing Android Application Crashes"; IEEE International Conference on Software Testing, Verification and Validation (2016); 12 pgs.

Tan, S. et al., "Repairing Crashes in Android Apps"; Association for Computing Machinery (2018); 12 pgs.

Chakravorty, S. et al., "Proactive Fault Tolerance in MPI Applications via Task Migration"; Department of Computer Science, University of Illinois at Urbana-Champaign (2005); 7 pgs.

Pernosco Overview, https://pernos.co/about/overview; downloaded Jan. 9, 2021; 6 pgs.

Mell, P. et al., "Recommendations of the National Institute of Standards and Technology"; NIST Special Publication 800-145 (2011); 7 Pgs.

Pickles, R., "Practical Tools for Computational Steering"; Philosophical Transactions of The Royal Society A Mathematical Physical and Engineering Sciences (2005); 9 Pgs.

Monperrus, M., "Automatic Software Repair: a Bibliography"; arXiv:1807.00515v1 [cs.SE] (2018); 26 Pgs.

Google Git, kernel/pub/scm/linux/kernel/git/nico/archive/v0.99-pl9/./kernel/FPU-emu/fpuentry.c, Jul. 10, 2025, 09 pages.

Sabin Patrick, "Native—Human/ epdb", Github, Jul. 10, 2025, 02 pages, https://github.com/native-human/epdb.

The Linux Kernel, "Floating Point Coprocessor Data Transfer Instructions (CPDT)", Current State, Jul. 10, 2025, 04 pages.

Japan Patent Office, "Decision to Grant a Patent" Sep. 30, 2025, 05 Pages, JP Application No. 2022-130842.

* cited by examiner

CLOUD 120

REMOTE APPLICATION RECOVERY ENGINE 110

116

REMOTE APPLICATION RECOVERY SERVER

TROUBLESHOOTING STRATEGY HANDLER DATABASE 112

113

NETWORK 106

103(1)

102(1)

103(N)

102(N)

100

650

610

654N

654B

654C

654A

600

REMOTELY HEALING CRASHED PROCESSES

BACKGROUND

Technical Field

The present disclosure generally relates to networks, and more particularly, to systems and methods of remotely healing crashed processes.

Description of the Related Art

Users of computationally intensive applications, such as computer simulations or training of artificial intelligence (A.I.) models, may try to run those applications in their computing devices at first because it is not readily apparent for the users what the actual application resources involved may be before running the application. When attempting to run simulation or A.I. models, such applications may not even start running because of lack of memory or some accelerator device that is missing or otherwise unavailable in the host computing device. More complex scenarios are those in which the user application starts execution and is able to run for a while, for example several hours. After running for some time, the application crashes due to limitations in the user computing device.

Some approaches to pre-empting application crashing use application checkpointing. Checkpointing is usually explicitly programmed or configured before the system execution, which leads to extra effort and time required from the user. The user must explicitly program in checkpoint criteria. Checkpointing typically includes stopping the application, copying all the required data from the memory to reliable storage, and then continuing with the execution. If the application supports a checkpoint mechanism, the user may resume the application from the last saved checkpoint. Otherwise, the application is restarted from scratch, thus wasting several hours of processing previously performed.

SUMMARY

According to an embodiment of the present disclosure, a computer implemented method of repairing crashed applications includes detecting a crash in an application operating in a host computing device. The application is migrated to a remote computer server. The remote computer server provisions computing resources to the application, as the application is resident in the remote computer server. Operation of the application is executed, using the provisioned computing resources, in the remote computer server. Execution results are generated from the application, in the remote computer server. The generated execution results are migrated from the application back to the host computing device.

In one embodiment, it is determined whether the crash was caused by a resource constraint. The provisioning of computing resources in the remote computer server allocates computing resources to meet the resource constraint. As will be appreciated, the remote computer server acts as an auxiliary source for execution of the application when the original host computer is unable to meet the demands for operating the application. This may be a temporary situation for the host computer, for example, when the host computer is running more operations than it can currently handle. Or it may be an on-demand service so that a user may have access to higher end applications that require more resources than the current computer can handle.

According to another embodiment of the present disclosure, a computer program product for repairing crashed applications includes one or more computer readable storage media, and program instructions collectively stored on the one or more computer readable storage media. The program instructions include detecting a crash in an application operating in a host computing device. The application is migrated to a remote computer server. The remote computer server provisions computing resources to the application, as the application is resident in the remote computer server. Operation of the application is executed, using the provisioned computing resources, in the remote computer server. Execution results are generated from the application, in the remote computer server. The generated execution results are migrated from the application back to the host computing device.

According to one embodiment, the instructions identify one or more computing resource types required for the execution of the application. A lack of the identified computing resource types caused the crash. The provisioning of computing resources includes supplying, by the remote computer server, the identified computing resource types to the execution of the application.

This feature shows flexibility in the subject technology, where the embodiments may identify, for example, between memory requirements, hardware, and software instructions. The subject technology may identify what kind of resource was lacking in the host computing device and may then locate such a resource type within the remote server environment.

According to another embodiment of the present disclosure, a remote computer server for repairing crashed applications in a host computing device includes: a network connection; one or more computer readable storage media; a processor coupled to the network connection and coupled to the one or more computer readable storage media; and a computer program product including: program instructions collectively stored on the one or more computer readable storage media, the program instructions include detecting, through the network connection, a crash in an application operating in the host computing device. The application is migrated to the remote computer server, through the network connection. The remote computer server provisions computing resources to the application, as the application is resident in the remote computer server. Operation of the application, using the provisioned computing resources, is executed in the remote computer server. Execution results are generated from the application, in the remote computer server. The generated execution results from the application are migrated back to the host computing device.

According to one embodiment, the program instructions may also include identifying a pre-crash state of the application. The pre-crash state includes a current state of executed results. The instructions roll back the application to the pre-crash state, in the remote computer server, prior to provisioning the computing resources. This feature may eliminate the duplication of executing steps and thus saves time and computing resources from re-performing steps that already have results on file. The feature may also help lead to a seamless end user experience.

Moreover, and in general to the embodiments disclosed above, it will be appreciated that features of the subject technology provide an alternate avenue to computing assets when a local computing device is unable to handle the requirements needed by an application. In some instances, a local device may be able to handle some of the requirements for executing an application but then the device is missing one (or more) requirement(s). As will be seen, by migrating the application to a remote server, the application will be exposed to a more robust computing environment with access to larger pools of memory, newer and stronger hardware devices, and newer, improved versions of software tools, all of which can handle the load that the local device cannot. In another example scenario, it is common for a computing device to operate fully functionally for software applications that are available at the time of device purchase. However, as software applications become updated with new versions or new applications are designed with increasing computing requirements, the hardware and software of computing devices can quickly become outdated or unable to keep up with newer requirements. By migrating the application to a remote server and provisioning resources accessible by the remote server, the capability of the local computing device becomes inherently as strong as the remote computer server, thus allowing the local device to operate some applications it would otherwise be unable to physically execute.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of repairing crashed applications by provisioning resources remotely. Generally, the embodiments may be practiced in the field of computer networks and data processing. As will be appreciated, aspects of the subject disclosure forward a crashed application to a remote computer server where the application may be resumed and executed to its intended result. Aspects of the subject technology free applications to be run without knowing the resources involved to execute the application processes. This frees end users from having to design some application with a conservative approach to resource requirements. Additionally, applications may be run locally that exceed the physical capabilities of a local computing device by leveraging the resource capabilities of online remote computing systems. Moreover, the subject technology allows local devices to tap into newly developed resources including, for example, new processing chips, accelerators, read/write devices, etc., without having to necessarily upgrade the local computing device. Some embodiments of the subject technology may provide the crash repair automatically in such a seamless fashion that the end user may be unaware that a crash occurred because the execution results may be provided back to the host device in a way that is transparent to the user.

Example Architecture

Figure 1:
FIG. 1 is a block diagram of an architecture for remote repair of crashed applications, according to an illustrative embodiment.

FIG. 1 illustrates an example architecture 100 for remote repairing of crashed applications. Architecture 100 includes a network 106 that allows various computing devices 102(1) to 102(N) to communicate with each other, as well as other elements that are connected to the network 106, such as a troubleshooting strategy handler module 112, a remote application recovery server 116, and the cloud 120. In the context of providing crash recovery services under the subject disclosure, the computing devices 102(1) to 102(N) may be end user devices with insufficient resources to run compute intensive applications. One or more of the computing devices 102(1) to 102(N) have experienced an application crash that is being remedied by aspects of the system 100 as disclosed herein and in more detail in the following figures. In general, when one of the computing devices 102(1) to 102(N) experiences an application crash, a remote application recovery engine 110 may detect the crash event and may respond by providing services that repair the application remotely from the host source device, (the computing devices 102(1) to 102(N)), resume the execution of the application at the server level, and provide the execution results back to the original host device.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the remote application recovery engine 110, which is a software program running on the remote application recovery server 116, to communicate with the troubleshooting strategy handler module 112, computing devices 102(1) to 102(N), and the cloud 120, to provide data processing. The troubleshooting strategy handler module 112 may provide crash data recovery solutions that will be used to process one or more techniques described here. In one embodiment, the crash recovery processes are performed at least in part on the cloud 120, leveraging resources from multiple sources including physical and virtual devices. In cloud based embodiments, resources may be gathered from different computing devices connected to the cloud network. Accordingly, when reference is made to "provisioning resources by the remote computer server," it will be understood that the actual use of resources may be occurring in multiple devices or locations within the cloud 120.

For purposes of later discussion, several user devices appear in the drawing, to represent some examples of the computing devices that may be the source of data being analyzed for underlying crash causation, application resource requirements, application execution, and results. Aspects of the application data/documents (e.g., 103(1) and 103(N)) may be communicated over the network 106 with the remote application recovery engine 110 of the remote application recovery server 116. Today, user devices typically take the form of portable handsets, smart-phones, tablet computers, personal digital assistants (PDAs), and smart watches, although they may be implemented in other form factors, including consumer, and business electronic devices.

While the troubleshooting strategy handler module 112 and remote application recovery engine 110 are illustrated by way of example to be on different platforms, it will be understood that in various embodiments, the troubleshooting strategy handler module 112 and the remote application recovery server 116 may be combined. In other embodiments, these computing platforms may be implemented by virtual computing devices in the form of virtual machines or software containers that are hosted in a cloud 120, thereby providing an elastic architecture for processing and storage.

Figure 2:
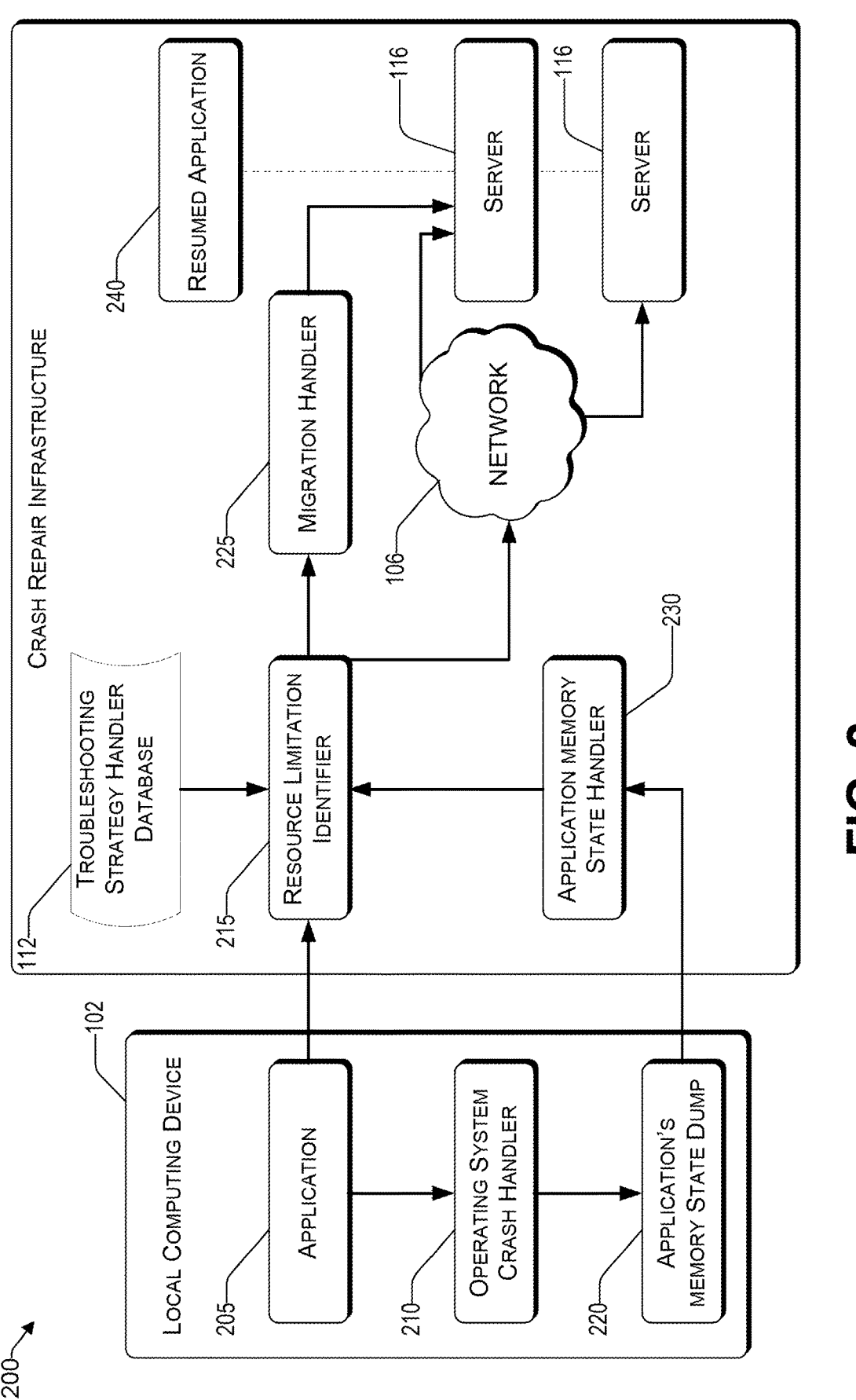
FIG. 2 is a block diagram of a system for remote repair of crashed applications, according to an illustrative embodiment.

Referring now to FIG. 2, a remote infrastructure 200 for repair of crashed applications is shown according to an embodiment. The infrastructure 200 may generally include elements used for retrieving and repairing a crashed application 205 from a local computing device 102. The crashed application 205, when processed under the subject technology, resumes execution in a remote server system 116 (shown as resumed application 240). The operation system crash handler 210 may generally be resident on the local computing device. The operation system crash handler 210 may retrieve and provide the crashed application memory state 220 to the remote infrastructure 200.

In the infrastructure 200, a memory state handler module 230 may receive the crashed application memory state image from the local computing device 102. A resource limitation identifier module 215 may receive the retrieved data associated with the crashed application 205 including a copy of the application and the current state of execution of the application before crashing. The troubleshooting strategy handler module 112 may be accessed to provide processes for identifying the root cause(s) of the crash and identifying the resources required for resuming execution of the application on the server side. A migration handler module 225 may coordinate migration of the crashed application 205 to the remote application recovery server(s) 116 and migration of the resumed application 240 results back to the local computing device 102. While the network 106, the remote server(s) 116, the resource limitation identifier module 215, and the migration handler module 225 are shown as separate elements, it will be understood that embodiments may generally integrate the resource limitation identifier module 215 and the migration handler module 225 in the server(s) 116, which in turn may be part of the network 106.

Example Methodology

Figure 3A:
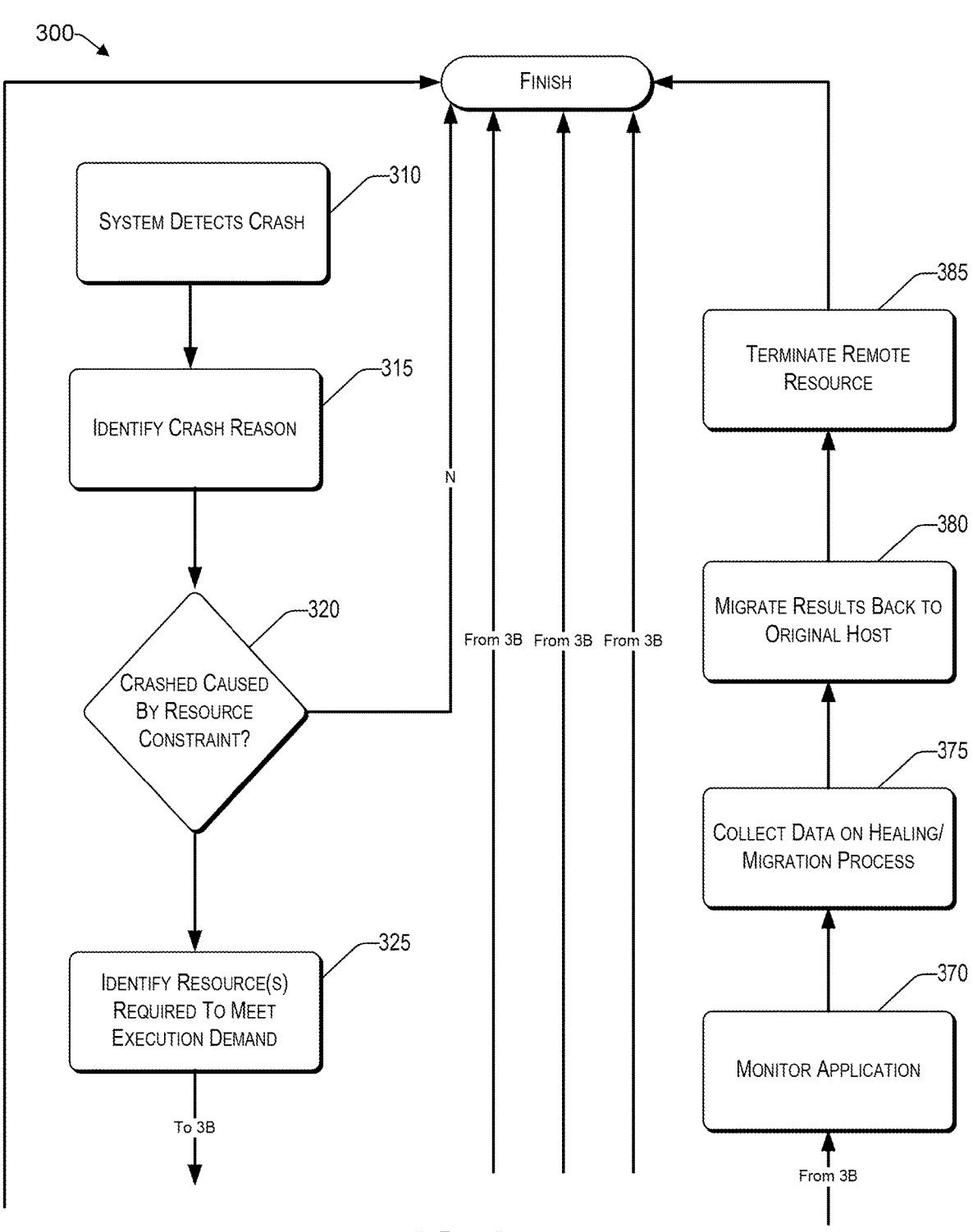
FIGS. 3A and 3B are a flowchart of a method for remotely repairing crashed applications, according to some embodiments.
Figure 3B:
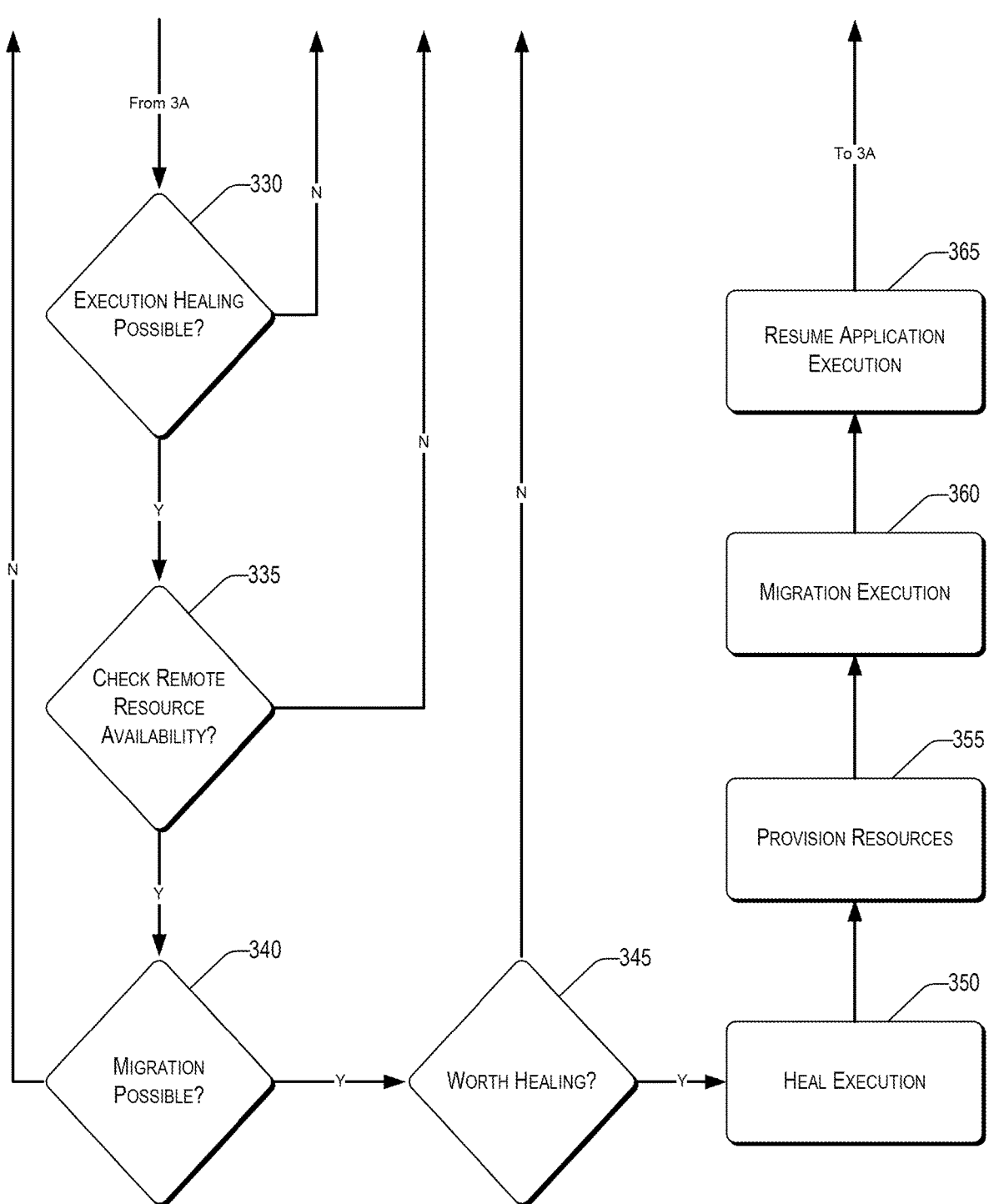

Referring now to FIGS. 3A and 3B, a method 300 for remotely repairing crashed applications is shown according to an exemplary embodiment. As described above, the following features may generally occur in a computer server remotely located from a local computing device running an application. References to the "system" may thus refer to one or more elements located remotely from the local device.

In general, operation of the method 300 may be triggered by the system detecting 310 an execution has interrupted/crashed in an application being run in the local device. The remote computer server (for example, the remote application recovery server 116) may identify 315 the reason for the application's crash. For example, using the resource limitation identifier module 215 (see FIG. 2), operating system metrics are monitored (for example, utilization increases of memory or storage) and log files (from both the operating system and application) may be used to identify the resource limitation that made the application crash. Examples of crash sources include application execution interruptions due to a limited amount of memory required by application or an application execution that at a certain point in time requires GPU instructions not available in the user device. The process's memory state file may also be inspected. The memory state may be searched for illegal instruction signals and bus error signals received by the process. Error codes and messages may also be picked from the top-most frames of each thread belonging to that memory state to help determine the reason for such a crash.

Figure 4:
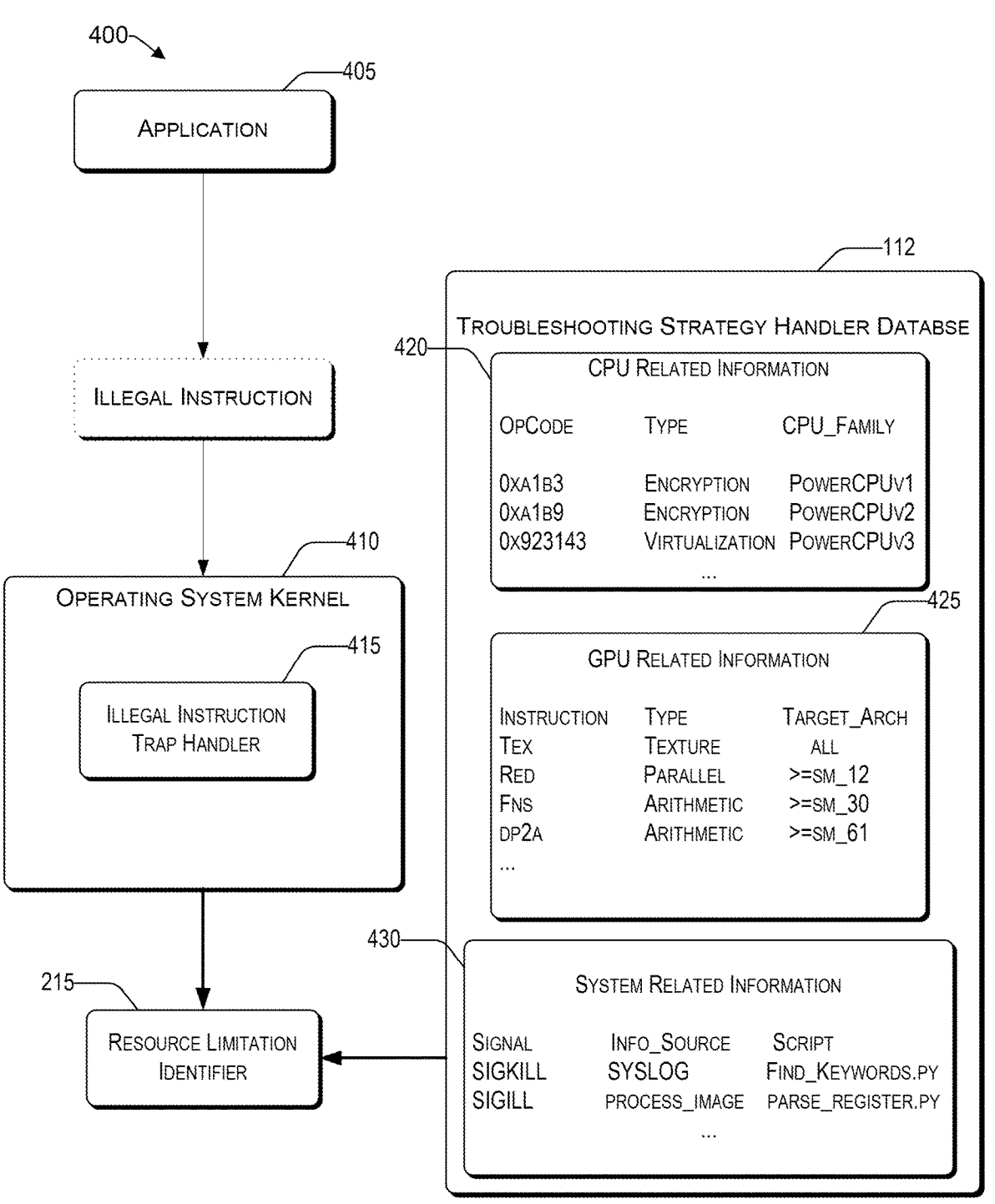
FIG. 4 is a flowchart of a method for identifying a missing computing resource, according to some embodiments.

Referring temporarily to FIG. 4, a crash recovery troubleshooting architecture 400 for identifying the underlying cause of a crash is shown according to an exemplary embodiment. The architecture 400 may be implemented by the troubleshooting strategy handler module 112 (FIG. 1). In general, the architecture 400 may be triggered when an application 405 encounters an illegal instruction. The local computing device's operating system 410 may include an illegal instruction trap handler module 415. In an example implementation, the software application 405, which was executing, crashed and produced a software or hardware trap that is caught by the local device's operating system 410. The local device's operating system 410 may collect the memory state of the process(es) associated with that software application 405 by capturing an image of the state. The illegal instruction trap handler module 415 saves the memory state data image to a file on disk. The file information on the illegal instruction may include the value of CPU registers at the time of the crash. The remote server system is then notified about the crash and receives a pointer to the process's memory state file. In some embodiments, the remote computer server includes the resource limitation identifier module 215.

The resource limitation identifier module 215 may read the captured image of the memory state provided from the local computing device. In addition, signals delivered to the process may be checked. The resource limitation identifier module 215 may query the troubleshooting strategy handler database 112 to identify the faulty or missing resource.

The troubleshooting strategy handler database 112 may read the captured image from the resource limitation identifier module 440 to analyze CPU related information 420, GPU related information 425, and system related information 430. For example, if the process receives a "KILL" signal, the system parses the syslog for using the script "find_keywords.py" to find out why the signal was killed. This may happen for example, when an out of memory condition occurs or a program logic bug corrupted the process memory. As another example, if the process receives a "SIGILL" signal, the illegal instruction is scanned using the "parse_registers.py" script on the process image to extract the program counter and register values. The script looks up the program counter and register values in the CPU related information table 420.

In some embodiments, the remote computer server may determine 320 whether the cause of a crash is due to a resource constraint or resource access error. There are several reasons by which an application may be interrupted. One could be a hardware resource limitation or some software or input data dependency. In this step, if it is detected that the interruption is due to a software or input data dependency, a notification may be presented to the user and no further action may be taken. However, if the crash is due to a hardware limitation, the method may continue.

The remote computer server may identify 325 the type of the resource (or lack thereof) that caused the application execution to be interrupted and is needed by the local device to run the application to its intended result. Further investigation may be taken to understand what is missing to meet the application demand. For example, if the problem is a memory limitation, the remote computer server may generate an estimated amount of memory that is required by the application. Or if the problem is an instruction (or set of instructions) of a specific piece of hardware (for example, a GPU or another accelerator), the instructions and the type of hardware that is able to offer such instructions is identified.

Each type of resource can have a software component that describes how to identify such a demand. And there can be several implementations, including rule-based or machine-learning-based components.

When memory is the type of resource needed, it is very common for an application to be interrupted due to the limited amount of memory in the local device running the application. One possible embodiment estimates the amount of memory an application will need by checking storage (for example, the crash data troubleshooting module of FIG. 1), for previous executions of the same application including different input parameter values. For example, suppose a user runs a multi-agent simulation with 200 agents and the user device has 4 GB of RAM. With 200 agents, the application cannot be executed in the user device. However, the user is able to run with 5, 10, 20, 50, and 100 agents. By accessing the logs and operating system measurements, embodiments may estimate a curve (not shown) that associates the number of agents to memory consumption, which can then be used to estimate the amount of memory to run a given number of agents, such as 200, in the local user device. The curve can be of different shapes, such as linear or exponential.

In some instances, insufficient hardware is the cause of the crash. For example, processor architectures such as Advanced RISK Machine (ARM) provide CPUs that support a set of core instructions. Processor extensions are provided to hardware designers that want to include support for optional features: floating point and vector instructions are two examples. When the application code is compiled with support for such extended instructions, but the underlying hardware does not include the corresponding processor extensions, an "illegal instruction" trap is received by the operating system. By checking the registers upon such a trap, embodiments may determine which instruction failed and which hardware resource is to be allocated to allow that application to execute to completion.

In some embodiments, the remote computer server may determine 330 whether execution healing is possible. A set of verifications may be performed depending on the type and requirements of the application. Embodiments of such verifications include:

Verifying if an application relies on any type of resource only available locally (for example, intranet services).

If it is a native application, verifying if the application includes symbols to be used to backtrack its execution to a previous point in time. For example, an available technology to do so is record and replay debugging that uses such symbols along with the program counter so that it can roll back the application to a previous execution state.

If it is a managed application (i.e., with a higher-level runtime), employing a reverse debugger engine to reverse the program execution to the step exactly before the resource usage command to save software's execution context.

In some embodiments, the remote computer server may check 335 for resource availability in the remote infrastructure of the remote computer server before attempting to repair the application. The remote infrastructure provider may be queried to check whether the resources relevant to continue execution are available. If the resources are unavailable, processing may terminate.

If the resources are available, the system may fetch updated quotes for resources in the remote infrastructure. Once these quotes are obtained, the system uses them to estimate an hourly rate for the requested resources in the remote infrastructure. Once the rates are estimated, in one embodiment, the system estimates the total running time of the application and may ask the user whether he/she wants to continue (for example, some embodiments may involve additional accreditation or payment for the resources). If the user does not agree, processing may terminate.

In some embodiments, the remote computer server may determine 340 whether migration of the application is possible. The process's memory state is inspected for handlers on resources that have to be present at the destination host. Handlers that rely on local resources (such as a network connection to a host that belongs to the same private network) may not be possible to be restored at the destination server. The user may be requested for input for answering if there are any legal or compliance restrictions that do not allow the execution of an application in a remote location. Some embodiments may check beforehand if the resource for running the application is available on the remote infrastructure.

In some embodiments, the remote computer server may determine 345 whether the crashed application is worth healing. In some embodiments, repair may be performed from the point where the application crashed. The determination may involve comparing time to migrate execution from the point just before a crash versus the time to restart an application from start until the crashed point considering the new set of computing resources. Some embodiments may calculate the amount of computing resources and the processing time involved, compared to a threshold cutoff value, to prevent, for example, one application from consuming too much of the remote resources.

Generally, once the remote computer server identifies the resources involved to remotely run the application, the repair process is executed 350. The remote computer server locates the required resources and provisions 355 the resources for the execution of the application. The application may be migrated 360 from the host local computing device to the remote computer server. At the remote computer server, the execution of the application may be resumed 365. In some embodiments, the remote computer server may continue monitoring 370 the execution of the application looking for execution performance. In some embodiments, the remote computer server may understand resource usage application patterns. Resource usage of the application may include for example, memory, network, CPU, and accelerator usage to confirm whether the migration was successful in terms of selected troubleshooting strategy and allocated resources in the remote host. In some embodiments, the remote computer server may collect 375 information on the healing/migration processes undertaken. The collected information may be used in a learning process to enhance the troubleshooting strategy handler module 112. The executed application and results may be migrated 380 back to the original local computing device. In some embodiments, the connection to the remote computer server's resources may be terminated 385 after the application results are migrated back to the local computing device.

Example Computer Platform

Figure 5:
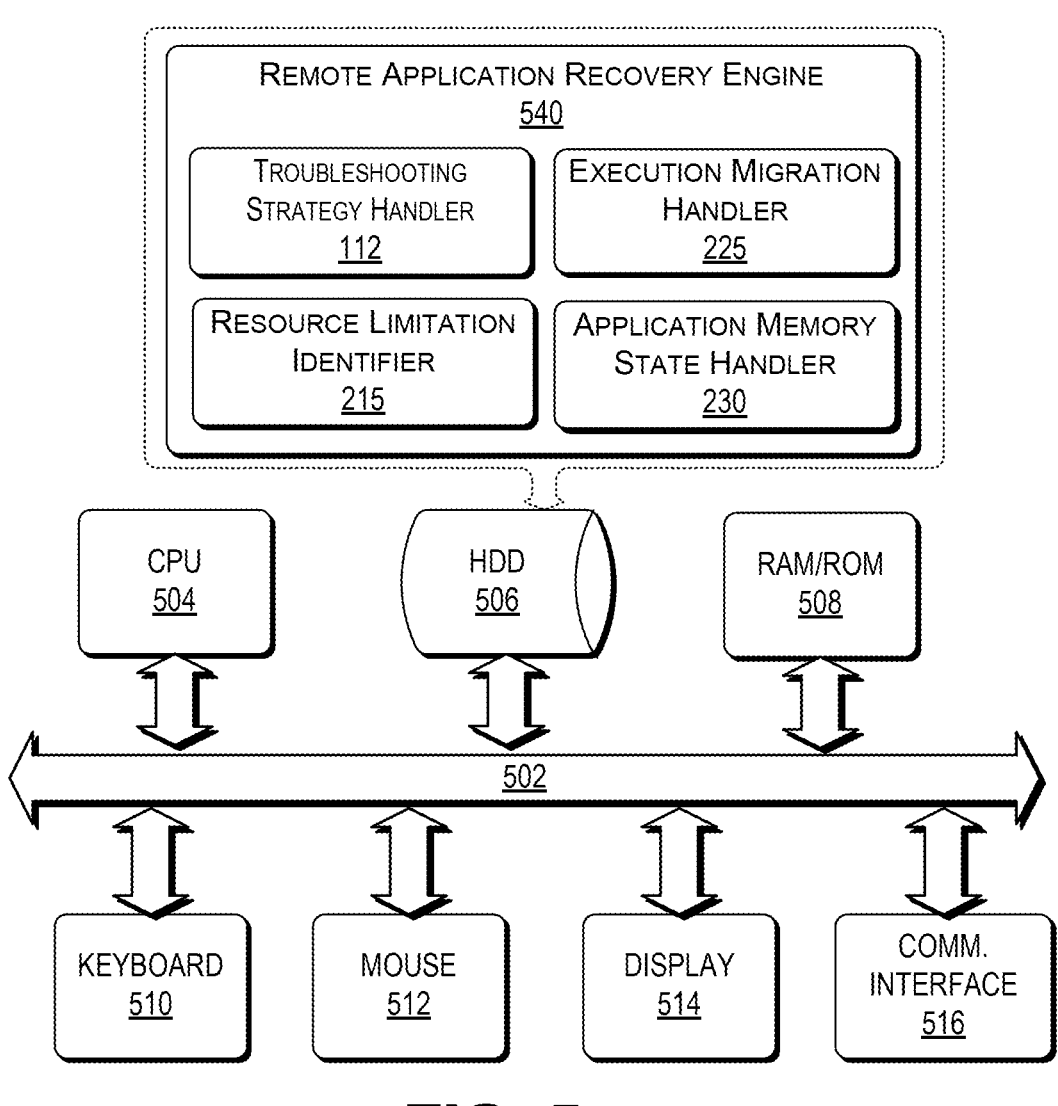
FIG. 5 is a functional block diagram illustration of a particularly configured computer hardware platform that can communicate with various networked components, consistent with an illustrative embodiment.

As discussed above, functions relating to interpretable modeling of the subject disclosure can be performed with the use of one or more computing devices connected for data communication via wireless or wired communication, as shown in FIG. 1. FIG. 5 is a functional block diagram illustration of a particularly configured computer hardware platform that can communicate with various networked components, such as the troubleshooting strategy handler module 112, the cloud, etc. In particular, FIG. 5 illustrates a network or host computer platform 500, as may be used to implement a server, such as the remote application recovery server 116 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the materials discovery machine learning engine 540, in a manner described herein. Generally, the remote application recovery engine 540 may be configured to automatically repair crashed applications and resume application execution remotely from a local device under the embodiments described above. The remote application recovery engine 540 may have various modules configured to perform different functions.

For example, the remote application recovery engine 540 may include the troubleshooting strategy handler module 112, the resource limitation identifier module 215, the execution migration handler module 225, and the application state memory handler module 230, whose functions have been previously described.

Example Cloud Platform

As discussed above, functions relating to data processing using a machine learning model to discover new materials for application specific tasks (for example carbon dioxide separation), may include a cloud computing environment 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
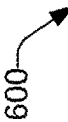
FIG. 6 depicts a cloud computing environment, consistent with an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
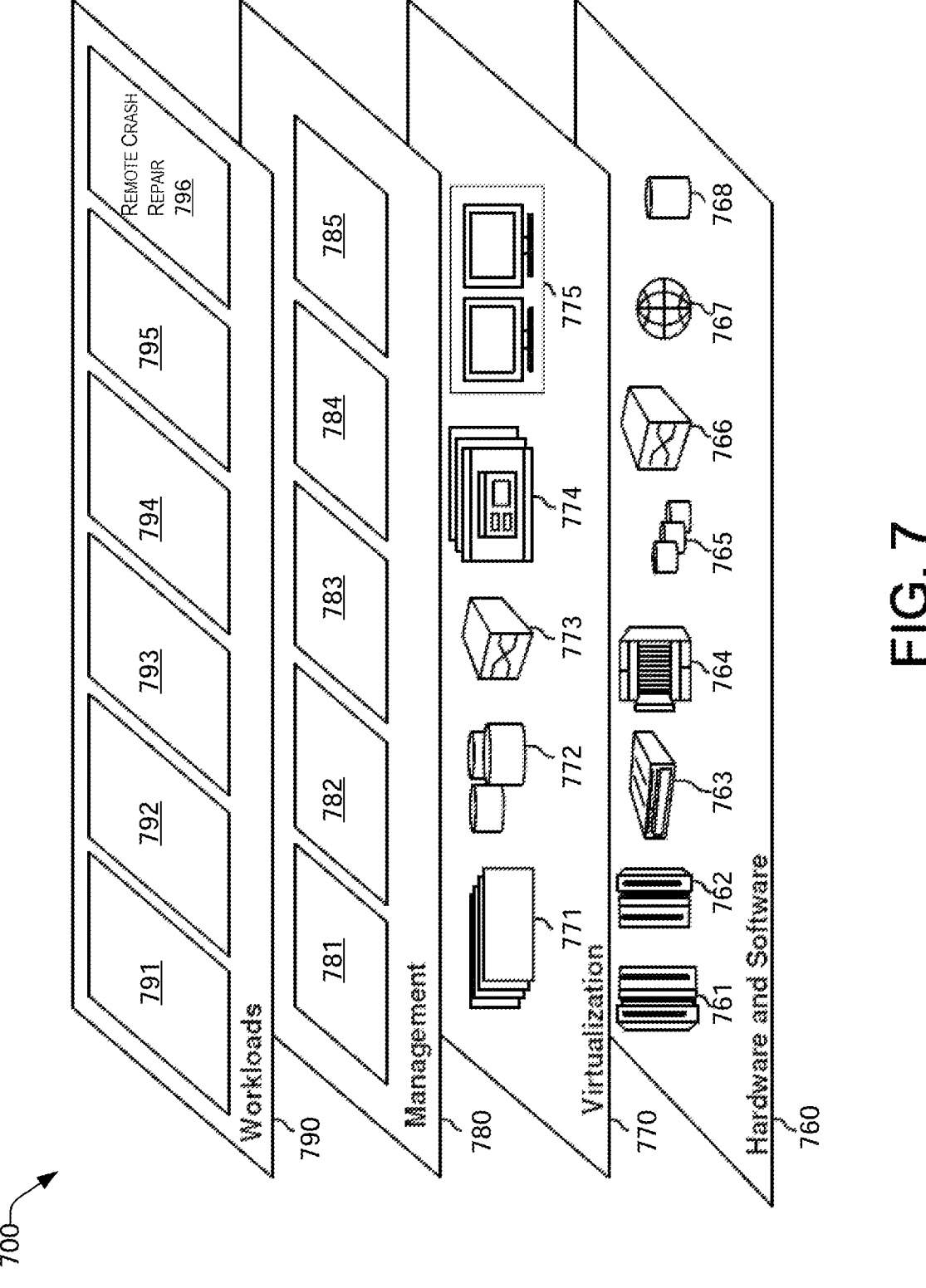
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and remote crash application repair and execution 796, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of repairing crashed applications, the computer-implemented method comprising:

upon detecting a crash in an application operating in a host computing device, identified by a trap handler module in an operating system kernel of the host computing device as an illegal instruction, determining computing resources of the host computing device;

receiving, by a resource limitation identifier module, data of the crashed application from the host computing device, wherein the data includes a copy of the application and a current state of operation of the application prior to the crash;

upon determining, by a remote module, that the crash in the application was caused by a resource constraint of the host computing device, determining, by the remote module, a threshold computing resources to resume an execution of a remaining operation of the crashed application on a remote computer server, wherein the determining of the threshold computing resources is based on the received data;

determining whether to repair the crashed application by:

comparing a time to migrate execution of the application from a point prior to the crash with a time to restart the application from start until a crashed point of the execution; and comparing each of an amount of the threshold computing resources and a processing time for repairing the crashed application with a threshold cutoff value;

migrating the crashed application to the remote computer server upon determining that the remote computer server has at least the threshold computing resources and upon determining to repair the crashed application;

provisioning, by the remote computer server, the threshold computing resources to the application, during the application being resident in the remote computer server;

executing the remaining operation of the application, using the provisioned threshold computing resources, in the remote computer server;

generating execution results from the application, in the remote computer server; and migrating the generated execution results from the application back to the host computing device, wherein the host computing device is a local computing device that is separate and remote from the remote computer server, and the host computing device remains operational and transparent to a user of the host computing device during the provisioning to the remote computer server.

2. The computer-implemented method of claim 1, further comprising identifying one or more computing resource types for execution of the application, wherein:

a lack of the identified one or more computing resource types caused the crash, and the provisioning of computing resources includes supplying, by the remote computer server, the identified one or more computing resource types to the execution of the application.

3. The computer-implemented method of claim 2, wherein:

the identified one or more computing resource types includes access to a piece of hardware, and the provisioning of computing resources includes accessing the piece of hardware in the remote computer server.

4. The computer-implemented method of claim 1, further comprising:

identifying a pre-crash state of the application, wherein the pre-crash state includes a current state of executed results, and the executed results correspond to the operation of the application; and rolling back the application to the pre-crash state, in the remote computer server, prior to provisioning the computing resources.

5. The computer-implemented method of claim 4, further comprising executing the application in the remote computer server, from the current state of executed results, prior to migrating the generated execution results from the application back to the host computing device.

6. The computer-implemented method of claim 1, further comprising:

determining a resource cost associated with repairing the application; and determining whether to provision the computing resources based on the resource cost.

7. The computer-implemented method of claim 1, further comprising:

receiving, by a memory state handler module, a memory state image from the host computing device, wherein an operating system of the host computing device captures the memory state image of processes associated with the application;

reading, by the resource limitation identifier module, the received memory state image;

querying, by the resource limitation identifier module, a troubleshooting strategy handler database; and determining, based on the querying, by the remote module, the threshold computing resources to resume the execution of the remaining operation of the crashed application on the remote computer server.

8. A computer program product for repairing crashed applications, the computer program product comprising:

one or more non-transitory computer readable storage media, and program instructions collectively stored on the one or more non-transitory computer readable storage media, wherein the program instructions when executed by a processor, cause the processor to perform operations comprising:

upon detecting a crash in an application operating in a host computing device, identified by a trap handler module in an operating system kernel of the host computing device as an illegal instruction, determining computing resources of the host computing device;

receiving, by a resource limitation identifier module, data of the crashed application from the host computing device, wherein the data includes a copy of the application and a current state of operation of the application prior to the crash;

upon determining, by a remote module, that the crash in the application was caused by a resource constraint of the host computing device, determining, by the remote module, a threshold computing resources to resume an execution of a remaining operation of the crashed application on a remote computer server, wherein the determining of the threshold computing resources is based on the received data;

determining whether to repair the crashed application by:

comparing a time to migrate execution of the application from a point prior to the crash with a time to restart the application from start until a crashed point of the execution; and comparing each of an amount of the threshold computing resources and a processing time for repairing the crashed application with a threshold cutoff value;

migrating the application to the remote computer server upon determining that the remote computer server has at least the threshold computing resources and upon determining to repair the crashed application;

provisioning, by the remote computer server, the threshold computing resources to the application, during the application being resident in the remote computer server;

executing the remaining operation of the application, using the provisioned threshold computing resources, in the remote computer server;

generating execution results from the application, in the remote computer server; and migrating the generated execution results from the application back to the host computing device, wherein the host computing device is a local computing device that is separate and remote from the remote computer server, and the host computing device remains operational and transparent to a user of the host computing device of the provisioning to the remote computer server.

9. The computer program product of claim 8, wherein the operations further comprise identifying one or more computing resource types for execution of the application, wherein:

a lack of the identified one or more computing resource types caused the crash, and the provisioning of computing resources includes supplying, by the remote computer server, the identified one or more computing resource types to the execution of the application.

10. The computer program product of claim 9, wherein:

the identified one or more computing resource types includes access to a piece of hardware, and the provisioning of computing resources includes accessing the piece of hardware in the remote computer server.

11. The computer program product of claim 8, wherein the operations further comprise:

identifying a pre-crash state of the application, wherein the pre-crash state includes a current state of executed results, and the executed results correspond to the operation of the application; and rolling back the application to the pre-crash state, in the remote computer server, prior to provisioning the computing resources.

12. The computer program product of claim 11, wherein the operations further comprise executing the application in the remote computer server, from the current state of executed results, prior to migrating the generated execution results from the application back to the host computing device.

13. The computer program product of claim 8, wherein the operations further comprise:

determining a resource cost associated with repairing the application; and determining whether to provision the computing resources based on the resource cost.

14. A remote computer server for repairing crashed applications in a host computing device, the remote computer server comprising:

a network connection;

one or more computer readable storage media;

a processor coupled to the network connection and coupled to the one or more computer readable storage media; and a computer program product comprising program instructions collectively stored on the one or more computer readable storage media, wherein the program instructions when executed by the processor, cause the processor to perform operations comprising:

detecting, through the network connection, a crash in an application operating in the host computing device;

upon detecting the crash in the application, identified by a trap handler module in an operating system kernel of the host computing device as an illegal instruction, determining computing resources of the host computing device;

receiving, by a resource limitation identifier module, data of the crashed application from the host computing device, wherein the data includes a copy of the application and a current state of operation of the application prior to the crash;

upon determining, by the remote computer server, that the crash in the application was caused by a resource constraint of the host computing device, determining, by the remote computer server, a threshold computing resources to resume an execution of a remaining operation of the crashed application on the remote computer server, wherein the determination of the threshold computing resources is based on the received data;

determining whether to repair the crashed application by:

comparing a time to migrate execution of the application from a point prior to the crash with a time to restart the application from start until a crashed point of the execution; and comparing each of an amount of the threshold computing resources and a processing time for repairing the crashed application with a threshold cutoff value;

receiving the application by the remote computer server, through the network connection upon determining to repair the crashed application;

provisioning, by the remote computer server, the threshold computing resources to the application, during the application being resident in the remote computer server;

executing the remaining operation of the application, using the provisioned threshold computing resources, in the remote computer server;

generating execution results from the application, in the remote computer server; and migrating the generated execution results from the application back to the host computing device, wherein the host computing device is a local computing device that is separate and remote from the remote computer server, and the host computing device remains operational and transparent to a user of the host computing device of the provisioning to the remote computer server.

15. The remote computer server of claim 14, wherein the operations further comprise identifying one or more computing resource types for execution of the application, wherein:

a lack of the identified one or more computing resource types caused the crash, and the provisioning of computing resources includes supplying, by the remote computer server, the identified one or more computing resource types to the execution of the application.

16. The remote computer server of claim 15, wherein:

the identified one or more computing resource types includes access to a piece of hardware, and the provisioning of computing resources includes accessing the piece of hardware in the remote computer server.

17. The remote computer server of claim 14, wherein the operations further comprise:

identifying a pre-crash state of the application based on the received data, wherein the pre-crash state includes a current state of executed results; and rolling back the application to the pre-crash state, in the remote computer server, prior to provisioning the computing resources.

18. The remote computer server of claim 17, wherein the operations further comprise executing the application in the remote computer server, from the current state of executed results, prior to migrating the generated execution results from the application back to the host computing device.

* * * * *